United States Patent
Hennings et al.

(10) Patent No.: US 6,778,906 B1
(45) Date of Patent: Aug. 17, 2004

(54) APPARATUS AND METHOD FOR ENSURING RETENTION OF SITUATIONAL AWARENESS BY EMPLOYING AN ACTIVE NETWORK GUIDANCE AND EMERGENCY LOGIC (ANGEL) SYSTEM

(75) Inventors: Elsa J. Hennings, Ridgecrest, CA (US); Barbara J. Austin, Ridgecrest, CA (US); Kent T. Edwards, Ridgecrest, CA (US); Norman W. Warner, Mechanicsville, MD (US); John I. Vian, Renton, WA (US); George N. Hennings, Ridgecrest, CA (US); Roy J. Harmon, Ridgecrest, CA (US); George M. Roe, Seattle, WA (US); Gregory A. Bass, Simi Valley, CA (US); Richard R. Blosser, Grand Junction, CO (US); Harold D. Warner, California, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 8 days.

(21) Appl. No.: 10/385,164

(22) Filed: Mar. 4, 2003

Related U.S. Application Data

(63) Continuation-in-part of application No. 09/931,625, filed on Aug. 14, 2001, now abandoned.

(51) Int. Cl.[7] ............................................. G06F 17/10
(52) U.S. Cl. .................. 701/301; 340/961; 342/357.06
(58) Field of Search ................................ 701/200, 201, 701/207, 208, 213, 300, 301, 302; 342/28, 29, 70, 71, 72, 195, 357.06, 357.08; 340/961

(56) References Cited

U.S. PATENT DOCUMENTS

| | | | | |
|---|---|---|---|---|
| 5,493,309 A | * | 2/1996 | Bjornholt | 342/455 |
| 5,983,161 A | * | 11/1999 | Lemelson et al. | 701/301 |
| 6,405,132 B1 | * | 6/2002 | Breed et al. | 701/301 |
| 6,487,500 B2 | * | 11/2002 | Lemelson et al. | 701/301 |
| 6,564,149 B2 | * | 5/2003 | Lai | 701/301 |
| 6,624,782 B2 | * | 9/2003 | Jocoy et al. | 342/70 |
| 6,675,095 B1 | * | 1/2004 | Bird et al. | 701/301 |

* cited by examiner

Primary Examiner—Richard M. Camby
(74) Attorney, Agent, or Firm—Laura R. Foster

(57) ABSTRACT

A preferred embodiment of the first aspect of the present invention relates to an apparatus for Active Network Guidance and Emergency Logic (ANGEL). ANGEL is a computer based program designed to function preferably in the mission computer on a vehicle, preferably an aircraft The program is preferably installed as part of an aircraft's Operational Flight Program (OFP) card(s) in the mission computer. ANGEL new versions and updates can be installed along with OFP updates. A second aspect of the present invention is a method for integrating and interacting with vehicle subsystems and controller subsystems, to prevent mishaps and accidents during a mission. ANGEL can prevent aircrew and aircraft problems by providing cueing or automation of emergency tasking, displaying procedures for aircrew to respond in emergency situations and providing assistance to an incapacitated pilot. In addition, ANGEL improves aircrew and aircraft survivability by reducing susceptibility to air to air and ground to air threats, reducing controlled flight into terrain and midair collisions and aiding in successful ejection from unrecoverable aircraft.

45 Claims, 1 Drawing Sheet

APPARATUS AND METHOD FOR ENSURING RETENTION OF SITUATIONAL AWARENESS BY EMPLOYING AN ACTIVE NETWORK GUIDANCE AND EMERGENCY LOGIC (ANGEL) SYSTEM

CROSS-REFERENCE TO RELATED APPLICATION

This application is a continuation-in-part of U.S. patent application Ser. No. 09/931,625 filed Aug. 14, 2001 now abandoned.

FIELD OF THE INVENTION

The present invention pertains to aircraft safety. In particular, a systematic approach for optimizing flight safety in which multiple systems are integrated and deconflicted on a variety of operational platforms in varying mission roles.

BACKGROUND

A significant number of aircraft are destroyed and aircrew killed or injured each year because of aviation mishaps. Data from the Naval Safety Center collected on F/A-18, F-14, AV-8B, TAV-8B, EA-6B, T-45, S-3, T-2C and TA-4 aircraft revealed that 268 aircraft were destroyed and 192 crewmembers were killed or suffered major injury from January 1987 through September 1996. Controlled-flight-into-terrain (CFIT) and mid-air collision, both typically resulting from a loss of situational awareness, accounted for a significant portion of these mishaps. Again according to the Naval Safety Center, these two mishap types accounted for approximately $1.8 billion in assets lost between 1990 and 1997.

Advances in aircraft technology have greatly expanded the flight envelope of operational aircraft, permitting them to perform a variety of military missions heretofore done only by specially configured platforms. This has resulted in the aircrew-aircraft interface becoming much more complex. Technology gains, coupled with a conscious decision to have single aircrew combat aircraft, have multiplied the pilot's workload. When cockpit workloads compress decision time during certain flight segments, cautionary displays may be insufficient or disregarded by the aircrew as it reaches cognitive overload. When emergencies occur, especially compound emergencies, the aircrew can lose situational awareness while attempting to timely identify, decide on, and initiate necessary actions. A major cause of loss of situational awareness is that the amount of information that aircrews must process can be overwhelming and contradictory. Displays and warning systems have progressed, yet the information can be lost in a flood of data.

Accordingly there is a need for a system that significantly enhances mission performance, prevents accidents and improves emergency event survivability by integrating functions from a variety of systems to adaptively automate some of the tasks in combat aircraft.

SUMMARY OF THE INVENTION

The present invention relates to an apparatus for ensuring retention of situational awareness by employing an Active Network Guidance and Emergency Logic (ANGEL) system and method of using the same. In accordance with a first aspect of the present invention, a system for integrating and interacting with vehicle subsystems and controller subsystems, to prevent mishaps and accidents occurring during a mission includes a collection component operating to gather vehicle and situation status data continuously from the vehicle subsystems and the controller subsystems, an analysis component operating to compare the contents of the status data to acceptable limits, and a first (normal) mode operating when the contents of the status data are within the acceptable limits, (wherein the controller subsystems can make inquiries of the vehicle subsystems and can direct the operation of the vehicle subsystems). The system further includes a second mode operating when the contents of the status data are outside of the acceptable limits to a moderate degree, advising the controller subsystems of unacceptable status data and advising of possible courses of action, (wherein the controller subsystems can make inquiries of the vehicle subsystems and can direct the operation of the vehicle subsystems). The system further includes a third mode operating when the contents of the status data are outside of the acceptable limits to a severe degree including a binary code assigned when the status data is outside of the acceptable limits to the severe degree, the binary codes prioritized according to the severity and possibility of mishaps, a binary word formed by collecting the binary codes in order of priority, corrective actions determined corresponding to the binary word, corrective actions performed by effecting the operation of the vehicle and controller subsystems, and definitions of the moderate degree and the severe degree being adjustable according to the changing requirements of the mission.

In accordance with a preferred embodiment of the present invention, preferably the system includes the Active Network Guidance and Emergency Logic (ANGEL) program. The vehicle subsystems are aircraft subsystems and the controller subsystems include those through which a pilot interacts with the vehicle subsystems, and/or a command and control system interacting with the vehicle subsystems. The vehicle subsystems can be selected and/or deselected according to the requirements of the mission at any time. Preferably the system is installed as part of an aircraft's Operational Flight Program (OFP). The system collects vehicle and situation status data continuously from at least one source selected from the group consisting of digital devices, analog devices, aural devices, devices communicating in three dimensions, shared memory devices, and any combination thereof. The sources can be located on a vehicle, on the ground, come from the controller, or from volatile and/or non-volatile memory. In addition, the preferred embodiment integrates and interacts with vehicle subsystems and controller subsystems by utilizing an intelligent agent (IA) and/or a decision table wherein both are particular to the vehicle and the controller.

Another embodiment of a first aspect of the present invention includes a system for integrating and interacting with vehicle subsystems and controller subsystems, to prevent mishaps and accidents occurring during a mission, including collecting means for gathering vehicle and situation status data continuously from the vehicle and controller subsystems, processing means for analyzing the status data by comparing the contents of the status data to acceptable limits, and means for operating in a first (normal) mode when the contents of the status data are within the acceptable limits, (wherein the controller subsystems can make inquiries of the vehicle subsystems and can direct the operation of the vehicle subsystems). The system further includes means for operating in a second mode when the contents of the status data are outside of the acceptable limits to a moderate degree, advising the controller subsystems of unacceptable status data, and advising of possible courses of action, (wherein the controller subsystems can make inquiries of the vehicle subsystems and can direct the operation of the vehicle subsystems). The system further includes means for operating in a third mode when the contents of the status data are outside of the acceptable limits to a severe degree including, means for assigning a binary code when the status data is outside of the acceptable limits to the severe degree, means for prioritizing the binary codes according to the severity and possibility of mishap, means for collecting the binary codes, in order of priority, to form a binary word, means for determining corrective actions corresponding to the binary word, means for effecting the operation of the vehicle and controller subsystems to perform the corrective actions, and means for adjusting the definitions of the moderate degree and the severe degree according to the changing requirements of the mission.

A second aspect of the present invention is a method for integrating and interacting with vehicle subsystems and controller subsystems, to prevent mishaps and accidents occurring during a mission, including gathering vehicle and situation status data continuously from the vehicle and controller subsystems, analyzing the status data by comparing it to known acceptable limits, and then operating in a normal mode when the data is within acceptable limits, wherein the controller subsystems can make inquiries of the vehicle subsystems and can direct the operation of the vehicle subsystems. The method further includes operating in a second mode when the contents of the status data are outside of acceptable limits to a moderate degree, advising the controller subsystems of the unacceptable status data and advising of courses of action, wherein the controller subsystems can make inquiries of the vehicle subsystems and can direct the operation of the vehicle subsystems. The method further includes, operating in a third mode when the contents of the status data are outside of the acceptable limits to a severe degree. The third mode operation includes assigning a binary code when the status data is outside of the acceptable limits to a severe degree, prioritizing the binary codes according to the severity and possibility of mishaps, collecting the binary codes, in order of priority, to form a binary word, determining corrective actions corresponding to the binary word, effecting the operation of the vehicle and controller subsystems to perform the corrective actions, and adjusting the definitions of "moderate" and "severe" degrees according to the changing requirements of the mission.

It is to be understood that the foregoing general description and the following detailed description and drawings are exemplary only and are not to be viewed as being restrictive of the present invention as claimed. These and other objects, features and advantages of the present invention will become apparent after a review of the following detailed description of the disclosed embodiments and the appended claims.

DETAILED DESCRIPTION OF THE PREFERRED EMBODIMENTS OF THE INVENTION

Figure 1:
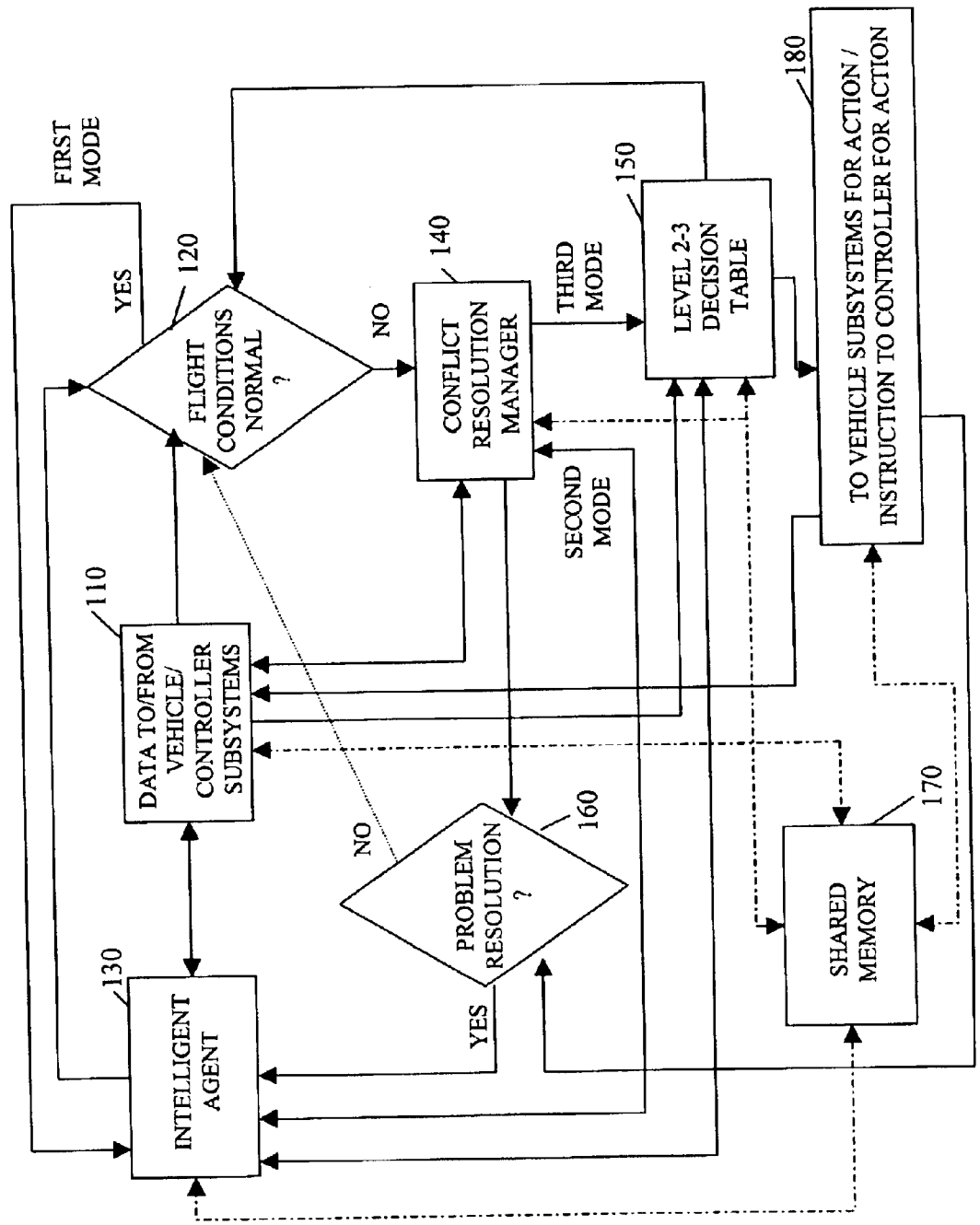
FIG. 1 is a block diagram that illustrates the basic configuration of the apparatus and method of integration and employment of the Active Network Guidance and Emergency Logic (ANGEL) system according to the present invention.

The present invention relates to an apparatus for ensuring retention of situational awareness by employing an Active Network Guidance and Emergency Logic (ANGEL) system and method of using the same. The apparatus is a computer based program capable of integrating and interacting with many or all of the subsystems on a vehicle (manned or unmanned) and the subsystems controlling the vehicle in such a way as to prevent accidents and improve emergency responses by notifying of important situations and by automating reactions according to the needs of the particular mission.

A preferred embodiment of the first aspect of the present invention relates to an apparatus for Active Network Guidance And Emergency Logic (ANGEL). ANGEL is a computer program designed to function preferably in the mission computer on a vehicle, preferably an aircraft (A detailed example of a preferred embodiment of the present invention used by an aircraft is described below.) The program is preferably installed as part of an aircraft's Operational Flight Program (OFP) card(s) in the mission computer. ANGEL new versions and updates can be installed along with OFP updates. ANGEL can prevent aircrew and aircraft problems by providing cueing or automation of emergency tasking, displaying procedures for aircrew to respond in emergency situations and providing assistance to an incapacitated pilot. In addition, ANGEL improves aircrew and aircraft survivability by reducing susceptibility to air to air and ground to air threats, reducing controlled flight into terrain and midair collisions and aiding in successful ejection from unrecoverable aircraft.

FIG. 1 illustrates a preferred embodiment of the present invention, ANGEL. ANGEL interacts with the vehicle and controller subsystems collecting and returning data 110 continuously. Examples of vehicle subsystems include but are not limited to digital devices, analog devices, aural devices, devices communicating in three dimensions, shared volatile or non-volatile memory devices 170 and sources located in the mission computer or elsewhere on the vehicle, and any combination thereof ANGEL can receive input from the 1553 avionics bus from external systems including but not limited to Global Positioning System (GPS), Inertial Navigation System (INS), radar altimeter, flight data recorder, electronic flight controls and Tactical Aircrew Moving Map Capability (TAMMAC). Examples of controller subsystems include but are not limited to systems used by a pilot or ground (or air) command and control centers to effect the operation of the vehicle such as cockpit controls, multi function display (MFD) lights or display, Heads Up Display (HUD), Helmut Mounted Display (HMD), audible alarm tones or words via speaker or headset, voice recognition systems, 3D positional sounds in head phones (such as those manufactured by AuSIM Inc.), head tracker, and biomedical sensors. The subsystems integrated and interacted with ANGEL can be selected or deselected according to the requirements of a particular mission. In a preferred embodiment ANGEL can store a number of pilot selection preferences at one time, as well as being able to be reconfigured during a mission.

Data regarding the condition and status of the vehicle is gathered, collected, and analyzed by comparing the data values to acceptable limits preferably to determine whether flight conditions are within normal ranges 120. When the data is acceptable ANGEL continues to gather data and interact with vehicle subsystems via an intelligent agent (IA) 130 described further below.

Intelligent Agent—Flight Conditions Normal

In a preferred embodiment of the present invention, when the data is within acceptable limits, the vehicle is in a safe condition and the flight condition is normal, the integration and interaction with the vehicle and controller subsystems is performed by an IA 130 in ANGEL's first (normal) mode.

The purpose of the IA is to provide decision support using representations of relevant expertise and dynamically-constructed context (e.g., mental model of situation) to aid decision-making during emergencies, and to provide mixed-initiative selection and activation of automation and presentation of information. Specifically, the agent's role is to manage the decision support system functional capability areas mentioned below. The IA's purpose is achieved by its ability to maintain situational awareness about the pilot's actions and the vehicle subsystem actions and its ability to monitor and control its provision of the decision support capabilities. (One example of an IA is IGEN manufactured by Chi Systems.)

According to a preferred embodiment of the present invention, the IA provides decision support, broken into two layers: the executive oversight layer and the control layer. The executive layer assesses and evaluates context (e.g the tactical picture) while monitoring and prioritizing tasks (e.g., monitor system checks). It accomplishes this oversight by continuously gathering data about the aircrew, the mission, and the environment. Complementary to the executive oversight layer, the control layer provides a lower level of oversight. The control layer monitors system state and aircrew performance of lower level actions while monitoring, prioritizing, or performing lower level procedures (e.g., emergency procedures). This layer of functionality interacts with the pilot/vehicle interface, the technology subsystems, and receives commands from the decision table (discussed below).

Intelligent agent provides several decision support system functional capabilities including (but not limited to) decision options, adaptive information (i.e. display formats), adaptive automation, adaptive interface, voice query, task focusing and advice. "Decision options" are alternative courses of action presented to the pilot to support the decision making process, prioritized, for example, according to threat level, aircraft state, and fuel requirements. "Adaptive information" consists of cockpit Liquid Crystal Display (LCD) formats that are presented when requested by the pilot or are automatically displayed. "Adaptive automation" can be of two types: first, event based, activated by the pilot or the intelligent agent based upon predefined conditions, including but not limited to, aircraft location, altitude or airspeed, and second, performance based, performing tasks automatically when the pilot is unresponsive. "Adaptive interface" is provided by several multifunction cockpit LCDs. "Voice query" is defined as verbal requests from the pilot for information critical to the mission, supported, for example, by the Aircrew Decision Support System (ADSS). "Task focusing" involves signaling the pilot when a task the pilot should be performing has exceeded its acceptable limits or has not been accomplished. "Advice" presents flight critical information aurally as voice messages and visually on the cockpit LCDs when their trigger conditions occur during a mission.

In a preferred embodiment the pilot can ask the IA to perform tasks via voice or other subsystems without having to take attention away from aircraft operation. The IA can be characterized as acting as a copilot or an autopilot, performing tasks as the pilot orders them, or as the pilot has selected in his preferences.

Flight Conditions not Normal to a Moderate (Level 1–2)

In a preferred embodiment of the present invention, when the collected data is not in acceptable ranges, a conflict resolution manager 140 within ANGEL compares the values against the known normal parameters, deciding the severity of the situation. Each data value represented is characterized as a Level 1, 2, or 3 situation. The levels and the number of data values are combined so that the situation is determined to vary from normal conditions to a "moderate" degree or to a "severe" degree. The conflict resolution manager 140 directs ANGEL to proceed in the second mode when the situation is moderate or the third mode when the situation is severe. It is noteworthy that the parameters and definitions determining the levels (1, 2 or 3) and the degrees ("moderate", "severe") can be adjusted and/or updated according to the requirements of the mission, the vehicle, or the controller.

When ANGEL operates in a second mode situations determined to be Level 1 or 2 (or multiple situations) are of moderate degree. In Level 1 the IA 130 is operating and interacting with the controller subsystems (pilot) to return the vehicle to normal condition. In Level 2 a flight condition exists in which there is a deterioration in pilot capacity but aircraft is functioning safely and IA continuing to resolve issues as they come up.

Second Mode—Moderate Degree Examples
Level 1
Night/No Visual Reference 1 hour after sunset or 1 hour before local sunrise and with no stars, land or ships available for a frame of reference, the IA will provide a red horizon on the display to provide the reference for the pilot to help keep the pilot from becoming spatially disoriented.

Normal Operating Procedures Incorrect Potential Automation (Information)

Pilot performs erroneous procedural task(s), which causes incorrect information to be presented. The correct procedures could be automated when the pilot does not respond to correct the information presentation.

Immediate Caution

A caution light is illuminated, displayed on one of the MFDs, and a voice alert is provided to the pilot that his fuel is low. When the pilot does not acknowledge this caution by taking appropriate measures, this can develop into a more serious Level 2 situation.

Level 2
Immediate Caution

A caution light is illuminated, displayed on one of the MFDs, and a voice alert is provided to the pilot that his fuel is low. The pilot has not acknowledged this caution by taking appropriate measures therefore this is now a more serious Level 2 situation. The pilot now shuts down one engine to conserve fuel in response to communication from the IA.

Right Engine Fire

The right engine is on fire and the aircraft warns the pilot of a fire in the right engine. The IA will provide the correct NATOPS (Naval Air Training and Operational Procedures) for the pilot to follow. This can escalate to a severe situation moving to the third mode, if the pilot does not respond.

Flight Conditions not Normal to a Severe Degree (Level 2–3)

The conflict resolution manager 140 directs ANGEL to proceed in the third mode when there is a Level 3 situation or when a combination of situations in the second mode is severe. Again, it is noteworthy that the parameters and definitions determining the levels (1, 2 or 3) and the degrees ("moderate", "severe") can be adjusted and/or updated according to the requirements of the mission, the vehicle, or the controller.

In a preferred embodiment of the present invention a decision table 150 determines appropriate actions given various aircrew/aircraft problem situations. The decision table 150 represents aircrew/aircraft problem situation data and the appropriate actions required to enhance survivability of the aircrew/aircraft. The decision table 150 deconflicts and prioritizes subsystem actions that can result in aircrew/aircraft accidents, so as to provide a solution to a set of circumstances without causing a new problem situation. In the decision table 150 all possible combinations of the problem situations and the appropriate actions are represented.

In the decision table 150 a binary word is created by assigning binary codes according to the incoming data values. A "0" is assigned when the value is within the normal range given. A "1" is assigned when the value falls outside the normal range. In a preferred embodiment of the present invention there are 39 possible binary codes to make a binary word. The binary word is formed so that the responses to a number of concurrent situations do not overlap or conflict. The decision table is particular to the particular vehicle, its history of mishaps, and the possible corrective actions. There is an action assigned to each binary word. The vehicle subsystems are directed to perform the action or requests the controller through its subsystems to perform the action (e.g. tell the pilot to pull up). The action can be adjusted according to the preferences of the pilot or the requirements of the mission. The table continues to direct actions until the binary word reflects a return to normal operation or that the second mode is appropriate. While the decision table is active the IA operates at a limited capability to prevent any conflicts. This limited capability includes but is not limited to adaptive interface provided by several multifunction cockpit LCDs and voice queries from the pilot for information critical to the mission.

Severe Degree Examples

Level 2

Right Engine Fire

The right engine is on fire and the aircraft warns pilot of a fire in the right engine, the pilot does not respond, and the fire fighting procedures are performed automatically.

Right Engine Fire/Spin/Left Engine Off

The right engine is on fire, the aircraft is in a spin, and the left engine is off. The fire fighting procedures are performed automatically, the Spin Pilot Vehicle Interface information is displayed on the HMD and MFD, and the left engine will be automatically restarted if the pilot does not restart it manually within 6 seconds. If the left engine does not restart or the pilot cannot pull out of the spin, ANGEL will move to a more serious Level 3 situation.

Level 3

Right Engine/Fire/Spin/Left Engine Off

The right engine is on fire, the aircraft is in a spin, and the left engine is off. The fire fighting procedures are performed automatically. If the left engine does not restart or if the pilot cannot pull out of the spin, the Smart Escape System Display Ball will be uploaded onto the MFD, HUD and HMD if the pilot has time to set up for the ejection, or the eject prompt will flash onto all displays.

Predicted Altitude Less than MSA (Minimum Safe Altitude)

If the aircraft is at the lowest possible altitude to save pilot/aircraft, aircraft must begin automated avoidance maneuver to prevent controlled flight into terrain.

Not Recoverable

If there is nothing the pilot can do to recover the aircraft, he must eject. The Smart Escape System Display Ball will be uploaded onto the MFD, HUD and HMD if the pilot has time to set up for the ejection, or the eject prompt will flash onto all displays.

A second aspect of the present invention is a method for integrating and interacting with vehicle subsystems and controller subsystems, to prevent mishaps and accidents during a mission, including gathering vehicle and situation status data continuously from the vehicle and controller subsystems, analyzing the status data by comparing it to known acceptable limits, and then operating in a normal mode when the data is within acceptable limits, wherein the controller subsystems can make inquiries of the vehicle subsystems and can direct the operation of the vehicle subsystems. The method further includes operating in a second mode when the contents of the status data are outside of acceptable limits to a moderate degree, advising the controller subsystems of the unacceptable status data and advising of possible courses of action, wherein the controller subsystems can make inquiries of the vehicle subsystems and can direct the operation of the vehicle subsystems. The method further includes, operating in a third mode when the contents of the status data are outside of the acceptable limits to a severe degree. The third mode operation includes assigning a binary code when the status data is outside of the acceptable limits to a severe degree, prioritizing the binary codes according to the severity and possibility of mishap, collecting the binary codes, in order of priority, to form a binary word, determining corrective actions corresponding to the binary word, effecting the operation of the vehicle and controller subsystems to perform the corrective actions, and adjusting the definitions of "moderate" and "severe" degrees according to the changing requirements of the mission.

Example of the Preferred Embodiment of the Present Invention

Following a successful catapult launch from an aircraft carrier, the aircraft climbs to strike rendezvous. During the climb, severe weather is detected ahead in the planned flight path. This is considered a Level 1 situation and the intelligent agent's adaptive information functional capability displays a weather re-route, which can be automated when selected. Following the re-route, the aircraft continues to climb to cruise altitude.

During the cruise flight segment, the pilot detects smoke in the cockpit. The pilot verbally tells the aircraft this information. This results in ANGEL advancing to Level 2 and the IA provides advice to the pilot; in this case the Naval Air Training and Operational Procedures Standardization (NATOPS) checklist for this particular problem is displayed. In this scenario, the problem is not rectified by following the checklist, and the problem cascades to a right engine fire. Since this is currently the only problem facing the aircraft and pilot, ANGEL remains at level 2 but since the situation is severe ANGEL moves to the third mode and the decision table is activated. Some functionality of the intelligent agent is reduced to allow more resources to focus on the problem.

The pilot steps through the right engine fire checklist, extinguishing the fire before the engine fails. Back in normal flight condition status, the pilot descends to a low altitude to avoid SAM sites and navigates through a mountainous area. While the pilot's attention is diverted to avoiding the SAM sites, the aircraft comes within the warning buffer of a mountain, which transitions ANGEL to level 2. At this distance and speed, the aircraft is still far enough away such that ANGEL remains in the second mode and the Automatic Ground Collision Avoidance System (AGCAS) issues a warning to the pilot to alter course versus automatically pulling up to avoid the mountain. The pilot heeds the warning, and the aircraft reverts back to normal flight condition status. After the aircraft exits the mountainous area, a SAM site fires at the aircraft, prompting the intelligent agent's adaptive automation capability to automatically dispense chaff and flares, while the pilot performs a low altitude high "G" turn, causing the pilot to enter a "G"-induced Loss Of Consciousness (GLOC) state. The aircraft continues towards the ground, and as the pilot is unconscious and cannot respond to the AGCAS pull-up cues the situation is severe and ANGEL moves to level 3 and the third mode. In this mode, the AGCAS actively takes control of the aircraft and performs a wings-level 5 "G" pull-up maneuver. The aircraft continues to automatically avoid the ground until the pilot regains consciousness, at which time the flight status returns to normal condition.

As the pilot regains cruise altitude and heads for the original target, a new target location is transmitted via data link and is received by the intelligent agent. The intelligent agent's adaptive information capability calculates new waypoints, headings, and altitudes based on the new target information and the current aircraft position. Following a successful bomb launch at the new target, the aircraft detects hostile airborne targets. Using the intelligent agent's adaptive information, adaptive automation, adaptive interface, aircrew decision options, and task focusing capabilities, the pilot optimizes his air-to-air engagement capabilities and kills the hostile aircraft.

As the aircraft returns to the carrier via the new waypoints, the sun has set and fog has settled among a stretch of coastal mountains. The pilot starts to experience vertigo, a condition the pilot verbally communicates to the aircraft. The intelligent agent's adaptive information capability then displays an artificial horizon to eliminate the pilot's vertigo. While the pilot is recovering from vertigo, the aircraft approaches a mountain and, when the pilot misses the pull-up cues, ANGEL transitions to a level 3 situation and the third mode, causing the AGCAS system to perform an automatic wings-level 5 "G" pull-up. Under normal conditions the pilot successfully returns to the carrier and lands.

Although the description above contains much specificity, this should not be construed as limiting the scope of the invention but as merely providing an illustration of the presently preferred embodiment of the invention. Thus the scope of this invention should be determined by the appended claims and their legal equivalents.

What is claimed is:

1. A system for integrating and interacting with vehicle subsystems and controller subsystems, to prevent mishaps and accidents occurring during a mission, comprising:
   a collection component operating to gather vehicle and situation status data continuously from said vehicle subsystems and said controller subsystems, said status data having contents;
   an analysis component operating to compare said contents of said status data to acceptable limits;
   a first mode of operating when said contents of said status data are within said acceptable limits, wherein said controller subsystems are adapted to make inquiries of said vehicle subsystems and are adapted to direct the operation of said vehicle subsystems, wherein said first mode is a normal mode;
   a second mode of operating when said contents of said status data are outside of said acceptable limits to a moderate degree including:
      advising said controller subsystems of unacceptable status data,
      advising of courses of action, wherein said controller subsystems are adapted to make inquiries of said vehicle subsystems and are adapted to direct the operation of said vehicle subsystems;
   a third mode of operating when said contents of said status data are outside of said acceptable limits to a severe degree including:
      a binary code assigned when said status data is outside of said acceptable limits to said severe degree,
      said binary codes prioritized according to the severity and possibility of said mishaps,
      a binary word formed by collecting said binary codes in an order of priority, wherein
      corrective actions are determined corresponding to said binary word, wherein
      corrective actions corresponding to said binary word are performed by effecting the operation of said vehicle and controller subsystems; and
   definitions of said moderate degree and said severe degree being adjustable according to the changing requirements of said mission.

2. The system of claim 1 wherein said vehicle subsystems are aircraft subsystems.

3. The system of claim 1 wherein said controller subsystems comprise those through which a pilot interacts with said vehicle subsystems.

4. The system of claim 1 wherein said controller subsystems comprise a command and control system interacting with said vehicle subsystems.

5. The system of claim 1 wherein said system comprises the Active Network Guidance and Emergency Logic (ANGEL) program.

6. The system of claim 1 wherein the said vehicle subsystems can be selected and/or deselected according to the requirements of said mission at any time.

7. The system of claim 1 wherein said system is installed as part of an aircraft's Operational Flight Program (OFP).

8. The system of claim 1 wherein said collection component operating to gather vehicle and situation status data continuously from said vehicle subsystems and said controller subsystems gathers data from at least one source selected from the group consisting of digital devices, analog devices, aural devices, devices communicating in three dimensions, shared memory devices, and any combination thereof.

9. The system of claim 8 wherein said at least one source is located on a vehicle.

10. The system of claim 8 wherein said at least one source is ground based.

11. The system of claim 8 wherein said shared memory is volatile and/or non-volatile memory.

12. The system of claim 1 wherein the integrating and interacting with the vehicle and controller subsystems is performed by an intelligent agent.

13. The system of claim 1 wherein said third mode utilizes a decision table to assign said binary codes, to form said binary words, and to determine said corrective actions.

14. The system of claim 13 wherein said decision table is particular to a specific type of vehicle.

15. The system of claim 13 wherein said decision table is particular to a specific type of aircraft.

16. A system for integrating and interacting with vehicle subsystems and controller subsystems, to prevent mishaps and accidents occurring during a mission, comprising:
   collecting means for gathering vehicle and situation status data continuously from said vehicle and controller subsystems, said status data having contents;
   processing means for analyzing said status data by comparing said contents of said status data to acceptable limits;
   means for operating in a first mode when said contents of said status data are within said acceptable limits, wherein said controller subsystems are adapted to make inquiries of said vehicle subsystems and are adapted to direct the operation of said vehicle subsystems, wherein said first mode is a normal mode;

means for operating in a second mode when said contents of said status data are outside of said acceptable limits to a moderate degree including:
  advising said controller subsystems of unacceptable status data,
  advising of courses of action, wherein said controller subsystems are adapted to make inquiries of said vehicle subsystems and are adapted to direct the operation of said vehicle subsystems;

means for operating in a third mode when said contents of said status data is outside of said acceptable limits to a severe degree including:
  means for assigning a binary code when said status data is outside of said acceptable limits to said severe degree,
  means for prioritizing said binary codes according to the severity and possibility of said mishaps,
  means for collecting said binary codes, in an order of priority, to form a binary word,
  means for determining corrective actions corresponding to said binary word,
  means for effecting the operation of said vehicle and controller subsystems to perform said corrective actions corresponding to said binary word; and
means for adjusting the definitions of said moderate degree and said severe degree according to the changing requirements of said mission.

17. The system of claim 16 wherein said vehicle subsystems are aircraft subsystems.

18. The system of claim 16 wherein said controller subsystems comprise those through which a pilot interacts with said vehicle subsystems.

19. The system of claim 16 wherein said controller subsystems comprise a command and control system interacting with said vehicle subsystems.

20. The system of claim 16 wherein said system comprises the Active Network Guidance and Emergency Logic (ANGEL) program.

21. The system of claim 16 wherein the said vehicle subsystems can be selected and/or deselected according to the requirements of said mission at any time.

22. The system of claim 16 wherein said system is installed as part of an aircraft's Operational Flight Program (OFP).

23. The system of claim 16 wherein said collecting means gathers status data from at least one source selected from the group consisting of digital devices, analog devices, aural devices, devices communicating in three dimensions, shared memory devices, and any combination thereof.

24. The system of claim 23 wherein said at least one source is located on a vehicle.

25. The system of claim 23 wherein said at least one source is ground based.

26. The system of claim 23 wherein said shared memory is volatile and/or non-volatile memory.

27. The system of claim 16 wherein the integrating and interacting with the vehicle and controller subsystems is performed by an intelligent agent.

28. The system of claim 16 wherein said means for operating in a third mode utilizes a decision table to assign said binary codes, to form said binary words, and to determine said corrective actions.

29. The system of claim 28 wherein said decision table is particular to a specific type of vehicle.

30. The system of claim 28 wherein said decision table is particular to a specific type of aircraft.

31. A method for integrating and interacting with vehicle subsystems and controller subsystems, to prevent mishaps and accidents occurring during a mission, comprising:
  gathering vehicle and situation status data continuously from said vehicle and controller subsystems, said status data having contents;
  analyzing said status data by comparing said contents of said status data to acceptable limits;
  operating in a first mode when said contents of said status data are within said acceptable limits, wherein said controller subsystems are adapted to make inquiries of said vehicle subsystems and are adapted to direct the operation of said vehicle subsystems, wherein said first mode is a normal mode;
  operating in a second mode when said contents of said status data are outside of said acceptable limits to a moderate degree including:
    advising said controller subsystems of unacceptable status data,
    advising of possible courses of action, wherein said controller subsystems are adapted to make inquiries of said vehicle subsystems and are adapted to direct the operation of said vehicle subsystems;
  operating in a third mode when said contents of said status data are outside of said acceptable limits to a severe degree including:
    assigning a binary code when said status data is outside of said acceptable limits to said severe degree,
    prioritizing said binary codes according to the severity and possibility of said mishaps,
    collecting said binary codes, in an order of priority, to form a binary word,
    determining corrective actions corresponding to said binary word,
    effecting the operation of said vehicle and controller subsystems to perform said corrective actions corresponding to said binary word;
  adjusting the definitions of said moderate degree and said severe degree according to the changing requirements of said mission.

32. The method of claim 31 wherein said vehicle subsystems are aircraft subsystems.

33. The method of claim 31 wherein said controller subsystems comprise those through which a pilot interacts with said vehicle subsystems.

34. The method of claim 31 wherein said controller subsystems comprise a ground command and control system interacting with said vehicle subsystems.

35. The method of claim 31 wherein said method comprises the Active Network Guidance and Emergency Logic (ANGEL) program.

36. The method of claim 31 wherein the said vehicle subsystems can be selected and/or deselected according to the requirements of said mission at any time.

37. The method of claim 31 wherein said method is installed as part of an aircraft's Operational Flight Program (OFP).

38. The method of claim 31 wherein said gathering vehicle and situation status data continuously from said vehicle and controller subsystems includes gathering status data from at least one source selected from the group consisting of digital devices, analog devices, aural devices, devices communicating in three dimensions, shared memory devices, and any combination thereof.

39. The method of claim 38 wherein said at least one source is located on a vehicle.

40. The method of claim 38 wherein said at least one source is ground based.

41. The method of claim 38 wherein said shared memory is volatile and/or non-volatile memory.

42. The method of claim 31 wherein the integrating and interacting with the vehicle and controller subsystems is performed by an intelligent agent.

43. The method of claim 31 wherein said third mode utilizes a decision table to assign said binary codes, to form said binary words, and to determine said corrective actions.

44. The method of claim 43 wherein said decision table is particular to a specific type of vehicle.

45. The method of claim 43 wherein said decision table is particular to a specific type of aircraft.

* * * * *